United States Patent
Dobosz et al.

(10) Patent No.: US 9,530,449 B1
(45) Date of Patent: Dec. 27, 2016

(54) DISC SEPARATOR PLATE WITH MOUNTING PADS

(71) Applicant: Seagate Technology LLC, Cupertino, CA (US)

(72) Inventors: Stanislaw A. Dobosz, Savage, MN (US); Jackson W. Nichols, Belle Plaine, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/804,055

(22) Filed: Jul. 20, 2015

(51) Int. Cl.
*G11B 33/14* (2006.01)
*G11B 19/20* (2006.01)

(52) U.S. Cl.
CPC ........... *G11B 19/2045* (2013.01); *G11B 33/14* (2013.01)

(58) Field of Classification Search
CPC .................................. G11B 33/14; G11B 5/012
USPC ....................... 360/99.2, 99.12, 99.21, 99.11, 97.16, 360/97.01, 97.02
See application file for complete search history.

(56) References Cited

U.S. PATENT DOCUMENTS

| 6,542,328 | B2 | 4/2003 | Harrison et al. | |
|---|---|---|---|---|
| 6,888,697 | B1 | 5/2005 | Oveyssi | |
| 7,119,986 | B2 | 10/2006 | Alt et al. | |
| 7,733,602 | B2 | 6/2010 | Gross et al. | |
| 8,199,426 | B2 | 6/2012 | Hendriks | |
| 8,619,386 | B2 | 12/2013 | Chan | |
| 2005/0219739 | A1* | 10/2005 | Alt | G11B 5/54 360/99.18 |
| 2005/0270691 | A1* | 12/2005 | Pottebaum | G11B 33/142 360/97.14 |
| 2008/0100957 | A1* | 5/2008 | Gross | G11B 33/148 360/97.14 |
| 2009/0073607 | A1* | 3/2009 | Yu | G11B 25/043 360/97.14 |
| 2010/0091408 | A1* | 4/2010 | Albrecht | G11B 17/26 360/244 |
| 2010/0224517 | A1* | 9/2010 | Haggard | H01L 21/67369 206/308.1 |
| 2014/0335371 | A1* | 11/2014 | How | B21D 22/02 428/597 |

* cited by examiner

*Primary Examiner* — Allen T Cao
(74) *Attorney, Agent, or Firm* — Crawford Maunu PLLC

(57) ABSTRACT

Certain exemplary aspects of the present disclosure are directed towards an apparatus including a base deck, a plurality of storage mediums, and a plurality of disc separator plates. Each disc separator plate includes one or more mounting pad surfaces, at least one of the surfaces having a protrusion. The disc separator plates are coupled to one another and the base deck via the mounting pads, with the disc separator plates in a stacked arrangement. The protrusion or protrusions facilitate alignment of the plurality of disc separator plates in the stacked arrangement, and mitigate contact between the storage mediums and the disc separator plates.

20 Claims, 3 Drawing Sheets

SECTION A-A

SECTION A-A

SECTION A-A

DISC SEPARATOR PLATE WITH MOUNTING PADS

SUMMARY

Various example embodiments are directed to apparatuses and/or methods that facilitate the coupling of disc separator plates to a base deck. The coupling mitigates displacement of the disc separator plates and other components of a disc drive under various operating conditions, including those involving vibration and shock events that may otherwise cause contact between the disc separator plate and a storage medium ("disc"). In many implementations of the present disclosure, such disc separator plates also limit tolerance stack-up associated with coupling a number of disc separator plates to one another. One or more embodiments may be particularly applicable, for example, to disc drives in which disc separator plates (and spacers) are alternately stacked to mitigate or prevent the effect of turbulent atmospheric flow around a magnetoresistive head within the disc drive and mitigate displacement of the storage medium resulting from turbulent air flow excitation. These approaches may be carried out while also reducing assembly, part costs, stacking tolerances and the potential for data loss during a shock/vibration event.

In some embodiments of the present disclosure, an apparatus includes a plurality of storage mediums spaced apart from one another in a stacked arrangement, a base deck that houses the storage mediums, and a plurality of disc separator plates in a stacked arrangement. The disc separator plates extend into a space between peripheral ends of adjacent ones of the storage mediums. Each disc separator plate includes at least one mounting pad with a surface that faces a mounting pad surface of an adjacent one of the disc separator plates. One or more of the mounting pad surfaces include a protrusion extending toward and contacting the other one of the mounting pad surfaces. In various embodiments, the protrusion or protrusions facilitate alignment of the disc separator plates, in response to a force that couples the disc separator plates to one another and the base deck.

In more detailed embodiments of the present disclosure, the apparatus further includes a fastener coupled to a proximal surface of the base deck. The fastener exerts a downward force upon the plurality of disc separator plates. In such embodiments, one or more mounting pads are spaced along a peripheral end of the disc separator plates. Each mounting pad interacts with mounting pads of adjacent disc separator plates via one or more protrusions, with the stacked arrangement of disc separator plates being coupled to the base deck under compression exerted by the fastener. The protrusions maintain alignment of the stacked arrangement relative to the base deck by mitigating tolerance stack-up caused by the use of high-tolerance parts (e.g., disc separator plates and/or stacking rings). Accordingly, low-cost parts may be used while mitigating or preventing tolerance stack-up that could result in unwanted contact between the storage medium and disc separator plates, which can cause damage to the disc and data loss during vibration/shock events.

In various embodiments of the present disclosure, an apparatus includes a plurality of storage mediums, a base deck, a plurality of stacking rings, and a plurality of disc separator plates. The storage mediums are spaced apart from one another in a stacked arrangement. Each storage medium has a planar surface separated by a thickness and exhibits a periphery with a circular shape. The base deck includes a sidewall forming a cavity, and houses the plurality of storage mediums. Each stacking ring includes surfaces that are concentric with the periphery of the storage mediums and the base deck sidewall. The stacking rings extend laterally along a portion of the periphery of the storage mediums. The disc separator plates are arranged in a stacked arrangement and extend into a space between peripheral ends of adjacent ones of the storage mediums. Each disc separator plate includes at least one mounting pad having a surface that faces an adjacent surface of one of the stacking rings, wherein at least one of the mounting pad surfaces includes a protrusion extending toward and contacting the adjacent surface of the one of the stacking rings. The protrusion facilitates alignment of the plurality of disc separator plates and the plurality of stacking rings, under conditions in which a force is applied to couple the disc separator plates and the stacking rings to one another and to the base deck.

The above discussion/summary is not intended to describe each embodiment or every implementation of the present disclosure. The figures and detailed description that follow also exemplify various embodiments.

DESCRIPTION OF THE FIGURES

Various example embodiments may be more completely understood in consideration of the following detailed description in connection with the accompanying drawings, in which.

Figures 1A, 1B:
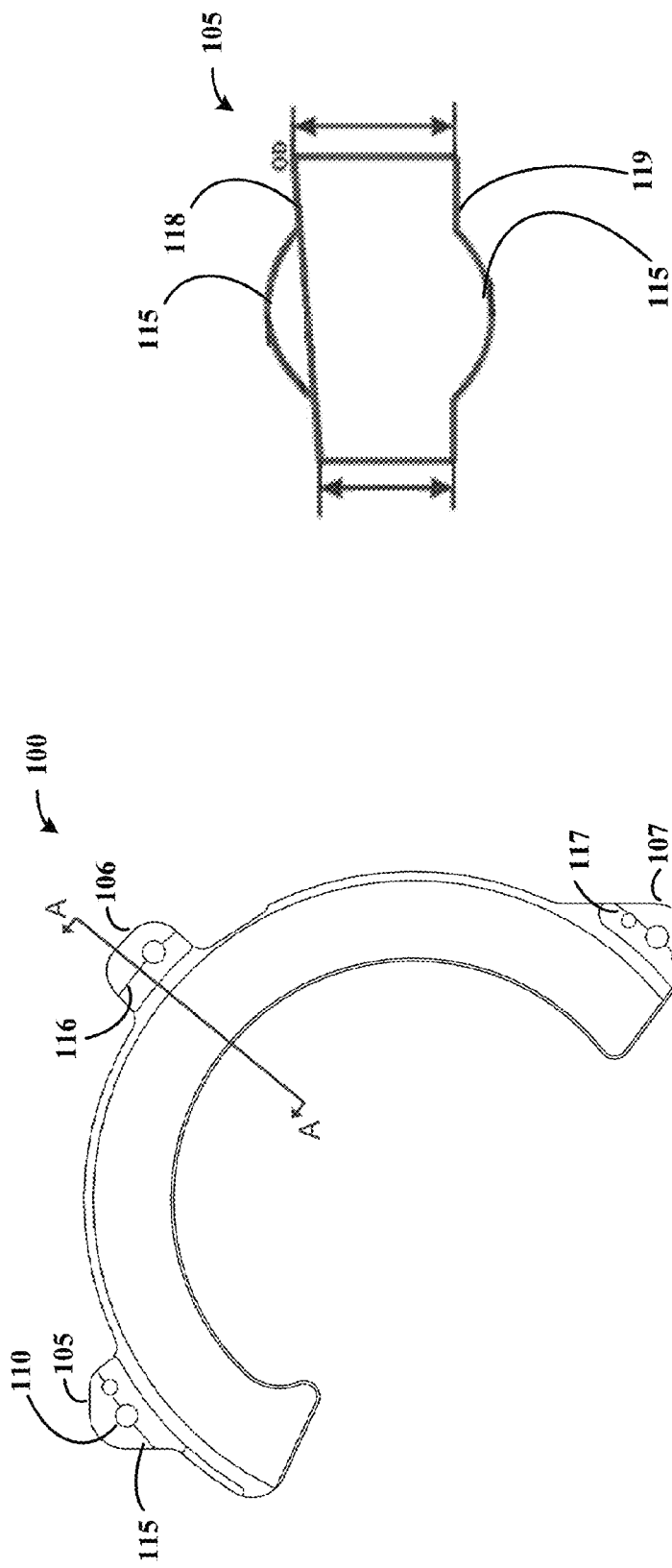
FIG. 1A is a top view of a disc separator plate, consistent with various aspects of the present disclosure.
FIG. 1B is a cross-sectional view of a mounting pad of the disc separator plate of FIG. 1A, consistent with various aspects of the present disclosure.

While various embodiments discussed herein are amenable to modifications and alternative forms, aspects thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present invention are believed to be applicable to a variety of different types of methods, devices, systems and arrangements involving disc separator plates in a stacked arrangement, such as those which may be implemented for disc drives. Disc separator plates may be used in disc drives to mitigate airflow caused by rotation of storage mediums. Specific embodiments are believed to be particularly beneficial to disc drives in applications prone to vibration/shock events. Various embodiments are applicable to addressing and mitigating issues related to the implementation of disc separator plates, including those relating to alignment of such plates relative to each other, and addressing related challenges including those discussed above.

Various aspects of the present disclosure are directed to approaches to coupling and supporting disc separator plates with enhanced resistance to (or mitigation of) moment forces on a stacked arrangement of the plates when coupled to a base deck of a disc drive. In some cases, such a moment force can be induced due to tolerances of mounting pads of the disc separator plates. For instance, when adjacent disc separator plates are mounted to one another, the tolerance of each mounting pad is cumulative and may result in tilt of the stacked arrangement and accordingly insufficient spacing between the disc separator plates and storage mediums. During operation, if the disc drive experiences vibration/shock events, such insufficient spacing between the disc separator plates and storage mediums may result in contact there between causing data loss or failure of the disc drive. Various embodiments of the present disclosure mitigate or eliminate tolerance-related tilt through the use of one or more protrusions on a surface of stacked mounting pads or other stacked structures in a disc drive. Without the potential (or with a reduced potential) for such tilt of the disc separator plates, disc drives may be arranged with discs and disc separator plates in closer proximity, which can be used to provide a reduced Z-height and/or a larger capacity disc drive (e.g., utilizing sizing for a standardized disc drive size such as a 3.5" disc drive. While the present invention is not necessarily limited to disc drives, various aspects of the invention may be appreciated through a discussion of examples using these contexts. These approaches may also be implemented to reduce assembly costs, part costs, and the potential for data loss during shock/vibration events. Various embodiments are directed to an apparatus having storage mediums spaced apart from one another in a stacked arrangement having a plurality of disc separator plates, as may be housed in a base deck. The disc separator plates extend into a space between peripheral ends of adjacent ones of the storage mediums. Each disc separator plate includes at least one mounting pad with a surface that faces a mounting pad surface of an adjacent one of the disc separator plates. At least one of the mounting pad surfaces includes a protrusion extending toward the other one of the mounting pad surfaces. The protrusion or protrusions facilitate alignment of the disc separator plates, and can do so under conditions in which a force couples the plurality of disc separator plates to one another and the base deck. In more detailed embodiments, the protrusion or protrusions maintain a reduced area of contact, such as a single point or line of contact, between each disc separator plate (e.g., with a protrusion implemented between each pair of facing mounting pad surfaces).

In various embodiments, the storage mediums have planar surfaces separated by a thickness, and exhibit a periphery having a circular shape. The base deck includes a sidewall that is concentric with, and extends at least partially along, the periphery of the storage mediums. Each of the disc separator plates extends along the sidewall and laterally along the periphery of the storage mediums. Each disc separator plate operates with the base deck to mitigate gas flow caused by rotation of the storage mediums. In more specific embodiments, the protrusion and the adjacent mounting pad surfaces mitigate conformance of the mounting pad surfaces, by providing a reduced area of contact between the mounting pad surfaces under conditions in which a force compresses the adjacent mounting pad surfaces together. This reduced area of contact may, for example, involve a point or line of contact that mitigates the generation of moment forces between the respective surfaces.

Various aspects of the present disclosure are directed to apparatuses including disc drives that implement storage mediums and separator plates with one or more protrusions as characterized herein. In such embodiments, a transducer (e.g., a magnetoresistive transducer) accesses data storage locations on one of the plurality of storage mediums. The disc separator plates are circumferentially disposed at an outer circumference of the plurality of storage mediums and direct airflow generated by rotation of the storage mediums away from the transducer, thereby mitigating gas flow forces upon the transducer. In more specific embodiments, the disc separator plates mitigate air flow-induced turbulence on the plurality of discs and stabilize a layer of air flow at a junction between the peripheral ends of the plurality of storage mediums and a sidewall of the base deck that is concentric with, and extends at least partially along, the periphery of the storage mediums.

In many embodiments, the protrusion mitigates tilt of the stacked disc separator plate arrangement associated with mounting pad tolerances by providing a reduced area of contact between the one of the mounting pad surfaces and the other one of the mounting pad surfaces. This approach substantially eliminates torque acting on each of the disc separator plates, as would be due to interactions between the respective surfaces in response to forces that couple the plurality of disc separator plates to one another and the base deck. In some embodiments, the disc separator plates and the base deck operate to prevent contact between the plurality of storage mediums and the disc separator plates (e.g., during operation of the disc drive, and in response to vibration/shock events).

Another embodiment is directed to an apparatus having storage mediums spaced apart from one another in a stacked arrangement, one or more transducers that access data storage locations on the storage medium(s), and a base deck having a sidewall forming a cavity that houses the storage mediums and transducer(s). Each storage medium has a planar surface separated by a thickness and exhibits a periphery having a circular shape. A plurality of separator plates extend into a space between peripheral ends of adjacent ones of the storage mediums. In such embodiments, the disc separator plates are coupled in a stacked arrangement to the base deck via mounting pads attached to each of the disc separator plates. One or more of the mounting pads utilizing protrusions extending from a surface of the mounting pad to mitigate stack-up tolerances that may increase the likelihood of contact between one of the storage mediums and one of the disc separator plates during a vibration/shock event due to a cumulative tilt of the stacked arrangement or other space limitation that may result in such contact.

In various embodiments of the present disclosure, an apparatus includes storage mediums, a base deck, stacking rings, and disc separator plates, with the storage mediums spaced apart from one another in a stacked arrangement and having a planar surface separated by a thickness and exhibiting a periphery with a circular shape. The base deck includes a sidewall forming a cavity, and houses the storage mediums. Each stacking ring includes surfaces that are concentric with the periphery of the storage mediums and the base deck sidewall. The stacking rings extend laterally along a portion of the periphery of the storage mediums. The disc separator plates are arranged in a stacked arrangement extending into a space between peripheral ends of adjacent ones of the storage mediums. Each disc separator plate includes at least one mounting pad having a surface that faces an adjacent surface of one of the stacking rings, in which one or more of the mounting pad surfaces include a protrusion extending toward and contacting the adjacent surface of the one of the stacking rings. The protrusion facilitates alignment of the disc separator plates and the stacking rings under conditions in which a force couples the disc separator plates and the stacking rings to one another and to the base deck.

In further more specific embodiments, a fastener couples the disc separator plates and the stacking rings to one another and the base deck by directing the force through the mounting pad of each disc separator plate. The fastener may be coupled to a proximal surface of the base deck, and exert a downward force upon disc separator plates and stacking rings that space apart the disc separator plates. The disc separator plates include one or more mounting pads with circumferential protrusions on one or more surfaces of the mounting pads. Each protrusion interacts with one of the adjacent stacking rings to prevent conformance of the surfaces of the mounting pad and the adjacent stacking ring during coupling of the stacked arrangement to a base deck of a disc drive. These protrusions mitigate tolerance stack-up caused by the use of high-tolerance parts (e.g., disc separator plates and/or stacking rings), which may otherwise cause tilt of the disc separator plates relative to the storage mediums. Accordingly, the present embodiment allows for the use of low-cost, high-tolerance parts, while preventing tolerance stack-up that could result in unwanted contact between the storage medium and disc separator plates causing damage to the disc and/or data loss during vibration/shock events.

It is to be understood that the protrusion may take a number of different shapes and forms including a series of protrusions extending from the surface of the mounting pads in a circumferential pattern relative to an axis of the rotating storage mediums, a single semi-circular protrusion on each of the mounting pads, or other protrusions that would mitigate or prevent conformance of adjacent mounting pad surfaces to one another.

Turning now to the figures, various embodiments of the present disclosure are presented by way of the illustrations, FIG. 1A shows a top view of a disc separator plate 100, consistent with various aspects of the present disclosure. The disc separator plate 100 includes a number of mounting pads 105, 105 and 107 which couple the disc separator plate 100 to other disc separator plates (or stacking rings) in a stacked arrangement. The stacked arrangement may ultimately be coupled to a base deck of a disc drive. Protrusions 115, 116 and 117 create a reduced area of contact, such as a point or line of contact (e.g., a pivot point), between the adjacent disc separator plates in the stacked arrangement. The protrusions operate to mitigate tilting of the plates relative to one another when assembled, by preventing facing surfaces from directly mating. In some embodiments, the disc separator plate 100 is coupled to the stacked arrangement and the base deck using fasteners that extend through openings, with opening 110 labeled by way of example.

FIG. 1B is a cross-sectional view of mounting pad 105 from FIG. 1A with an exemplary tolerance shown on generally flat portions of top and bottom surfaces 118 and 119 (e.g., 0.123"±0.001"). Accordingly the length between the surfaces 118 and 119 on one side of the mounting pad 105 could vary as shown (e.g., with the shorter height being 0.122" and taller height being 0.124"). Due to variances within an allowed tolerance, top surface 118 of the mounting pad 105 exhibits a slope relative to bottom surface 119. The protrusion 115 provides a pivot point between the two adjacent disc separator plates, preventing conformance of one mounting pad surface to another. Accordingly, the tilt of top surface 118 relative to bottom surface 119 does not affect or translate through the stacked arrangement in a manner that may otherwise result in unacceptable cumulative tilt of the stacked arrangement. Such cumulative tilt of the stacked arrangement may otherwise result in unwanted contact between the disc separator plates 100 and storage mediums during operation of a disc drive (e.g., during vibration and shock events).

Under conditions in which the disc separator plate 100 exhibits variations in dimensions due to allowed tolerances (e.g., flatness tolerance relative to top and bottom surfaces of the mounting pad 105), the cumulative effect of such tolerances in a stacked arrangement can be mitigated. This can reduce tilting that may otherwise occur when the stacked arrangement is coupled. Due to surface conformance of adjacent mounting pads, the tolerance of each mounting pad 105 in a stacked arrangement may thus otherwise accumulate, and may result in a large tilt on a top or bottom disc separator plate. Accordingly, the embodiments shown in FIGS. 1A and 1B (or as may be used with the embodiments in FIGS. 2A and 2B), operate to reduce the potential that a top (or other) disc separator plate in a stacked arrangement of contacts an adjacent storage medium, which can cause data loss and/or failure of the disc drive. By using a protrusion 115 on one or more surfaces in a stacked arrangement, a point or line of contact (e.g., a pivot point) can be created between adjacent disc separator plates to mitigate stack-tilt.

Figure 2B:
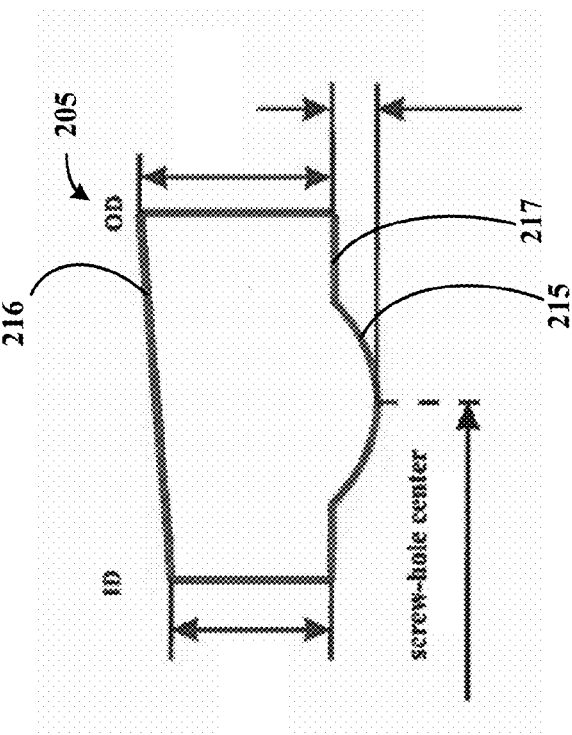
FIG. 2B is a cross-sectional view of the mounting pad of the disc separator plate of FIG. 2A, consistent with various aspects of the present disclosure.
Figure 2A:
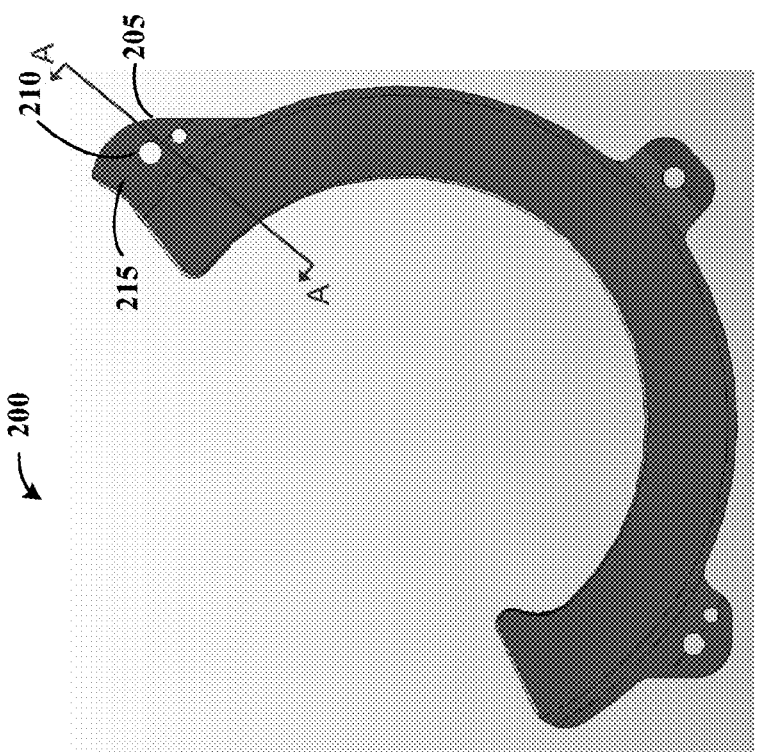
FIG. 2A is a bottom view of a disc separator plate, consistent with various aspects of the present disclosure.

FIG. 2A is a bottom view of a disc separator plate 200, consistent with various aspects of the present disclosure. A circumferential protrusion 215 is located on a bottom surface of a mounting pad 205. The circumferential protrusion 215 extends across all of the mounting pads 205 and provides a single pivot point upon which the disc separator plate 200 is coupled to another disc separator plate, spacer, or disc drive base deck. In various embodiments, the circumferential protrusion 215 is implemented with various forms, such as a series of circumferential protrusions extending from the surface of the mounting pads 205, a single semi-circular protrusion on each of the mounting pads 205, or other similar protrusion that would prevent conformance of adjacent mounting pad surfaces to one another. In more specific embodiments, each circumferential protrusion 215 mates with a concave feature on a surface of the adjacent mounting pad surface providing both vertical and horizontal alignment of the disc separator plate stacked arrangement.

FIG. 2B is a cross-sectional view of the mounting pad 205 of the disc separator plate 200 of FIG. 2A with an exemplary tolerance on the flatness of opposing surfaces 216 and 217 (e.g., 0.123"±0.001"). The flatness tolerance on the top surface 216 of the mounting pad 205 results in a sloped top surface 216 relative to the bottom surface 217. Similar to the mounting pad 105 in FIG. 1A-B, due to the protrusion 215 (when coupled) the adjacent disc separator plate mounting pad does not come into direct contact with the bottom surface 217 of the mounting pad 205. Instead, the adjacent disc separator plate mounting pad's top surface contacts the circumferential protrusion 215 of the disc separator plate 200. Accordingly, the adjacent surfaces of the respective mounting pads 205 will not be placed into conformance with one another. Instead, the pivot point between the protrusion 215 and the adjacent mounting pad surface maintains vertical alignment of the stacked disc separator plate arrangement.

Referring back to FIGS. 1A, 1B, 2A and 2B, the various plates as shown with protrusions can be combined and used with multiple stacked plates in a variety of manners. For instance, plates having protrusions on both upper and lower surfaces may be stacked adjacent one another, with protrusions between adjacent plates contacting one another. Plates with a single protrusion, extending upward or downward, may be stacked adjacent other plates having a flat surface facing the protrusion. Further, adjacent plates with a single protrusion may be stacked such that the protrusions face one another.

Figure 3A:
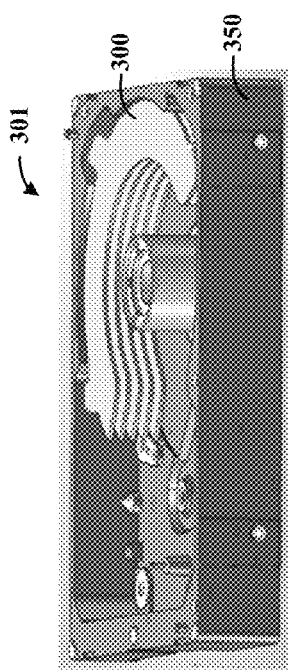
FIG. 3A is an isometric view of a partial disc drive assembly including a stacked arrangement of disc separator plates, consistent with various aspects of the present disclosure.

FIG. 3A is an isometric view of a partial disc drive assembly 301 including a stacked arrangement of disc separator plates 300 in a base deck 350, consistent with various aspects of the present disclosure. The stacked arrangement of disc separator plates 300 utilizes mounting pads with circumferential protrusions to maintain vertical alignment of the stacked arrangement 300 relative to the base deck 350, when a downward force is applied to couple the stacked arrangement 300 to the base deck 350.

Figure 3C:
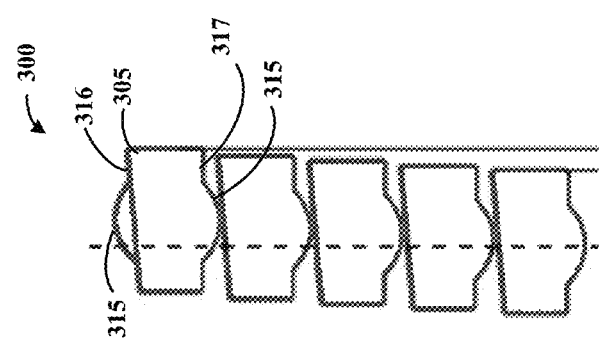
FIG. 3C is a cross-sectional view of the mounting pads of each disc separator plate in the stacked arrangement of FIG. 3B, consistent with various aspects of the present disclosure.
Figure 3B:
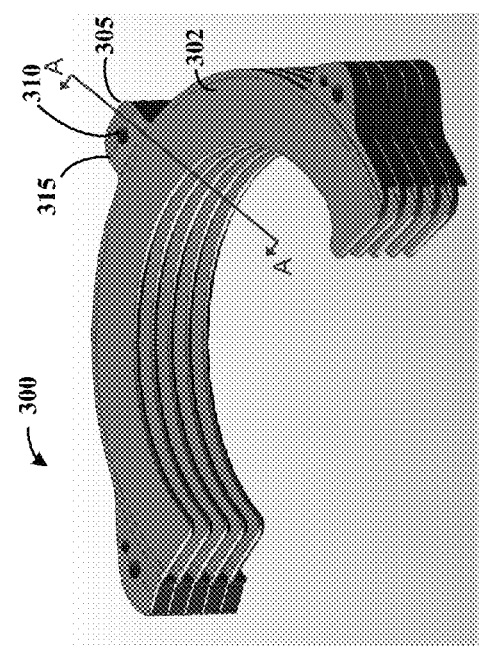
FIG. 3B is an isometric view of the stacked arrangement of disc separator plates from FIG. 3A, consistent with various aspects of the present disclosure.

FIG. 3B is an isometric view of the stacked arrangement 300 of disc separator plates 302 from FIG. 3A, consistent with various aspects of the present disclosure. Each disc separator plate 302 is coupled to the stacked arrangement 300 via one or more fasteners that extend through holes 310 in mounting pads 305. A circumferential protrusion 315, extending across the mounting pads 305 and a center-point of the holes 310, reduces or minimizes the interaction between surfaces of adjacent mounting pads. It is to be understood that the protrusion can be a ridge, one or more circular protrusions, or any other extrusion or indentation that reduces or minimizes the interaction between adjacent mounting pad surfaces.

FIG. 3C shows a cross-sectional view of the mounting pads 305 of each disc separator plate in the stacked arrangement 300 of FIGS. 3A-B. Each mounting pad 305 illustrates an exemplary tolerance on the flatness of opposing surfaces 316 and 317, which results in a sloped top surface 316 relative to the lower surface 317. When a coupling force is applied to the stacked arrangement 300, the protrusions 315 prevent conformance of adjacent mounting pad surfaces to one another, thereby preventing tolerance stack-up caused by the mounting pads 305. Such tolerance stack-up may otherwise result in the tilting of the stacked arrangement 300 relative to storage mediums in a disc drive. In some cases this tilting of the stacked arrangement 300 caused by tolerance stack-up can lead to undesirable contact between the disc separator plate and storage media during operation of the disc drive (e.g., vibration and shock events). As discussed in more detail above, tolerance stack-up may accumulate throughout the stacked arrangement 300 and create the largest tilt on the top disc separator plate. The protrusions 315 minimize stack-tilt caused by the coupling of the disc separator plates by creating a pivot point between adjacent disc separator plates, mitigating a tilt moment caused by conformance of adjacent mounting pad surfaces. Accordingly, low-cost, high-tolerance parts can be used while preventing tolerance stack-up that could result in damage to the disc drive and data loss during vibration/shock events.

Based upon the above discussion and illustrations, those skilled in the art will readily recognize that various modifications and changes may be made to the various embodiments without strictly following the exemplary embodiments and applications illustrated and described herein. For example, the protrusion may take a number of different shapes and forms including a series of protrusions extending from the surface of the mounting pads in a circumferential pattern relative to an axis of the rotating storage mediums, a single semi-circular protrusion on each of the mounting pads, or other protrusions that would prevent conformance of adjacent mounting pad surfaces to one another. Such modifications do not depart from the true spirit and scope of various aspects of the invention, including aspects set forth in the claims.

What is claimed is:

1. An apparatus for a disc drive comprising:
    a plurality of storage mediums spaced apart from one another in a stacked arrangement;
    a base deck configured and arranged to house the plurality of storage mediums; and
    a plurality of disc separator plates in a stacked arrangement extending into a space between peripheral ends of adjacent ones of the storage mediums, each disc separator plate including at least one mounting pad having a surface that faces a mounting pad surface of an adjacent one of the disc separator plates, wherein one of the mounting pad surfaces includes a protrusion extending toward and contacting the other one of the mounting pad surfaces.

2. The apparatus of claim 1, wherein the protrusion is configured and arranged to facilitate alignment of the plurality of disc separator plates relative to one another, in response to a force that couples the plurality of disc separator plates to one another and the base deck.

3. The apparatus of claim 1, further including a fastener configured and arranged to couple the plurality of disc separator plates to one another and the base deck by directing a force through the at least one mounting pad of each disc separator plate.

4. The apparatus of claim 1, wherein
    the protrusion is configured and arranged to maintain a single point of contact or a line of contact between each disc separator plate, and
    each disc separator plate is configured and arranged with the base deck to mitigate generation of gas flow via movement of the storage mediums.

5. The apparatus of claim 1, wherein
    the plurality of storage mediums have planar surfaces separated by a thickness and exhibit a periphery having a circular shape,
    the base deck includes a sidewall that is concentric with, and extends at least partially along, the periphery of the storage mediums,
    each of the plurality of disc separator plates extends along the sidewall and laterally along the periphery of the storage mediums, and
    each disc separator plate is configured and arranged with the base deck to mitigate gas flow caused by rotation of the plurality of storage mediums.

6. The apparatus of claim 1, wherein the protrusion is configured and arranged with the one of the mounting pad surfaces and the other one of the mounting pad surfaces to, in response to a force compressing the adjacent mounting pad surfaces together, mitigate conformance of the mounting pad surfaces to one another.

7. The apparatus of claim 1,
    further including a transducer configured and arranged to access data storage locations on one of the plurality of storage mediums, and
    wherein the disc separator plates are circumferentially disposed at an outer circumference of the plurality of storage mediums and configured and arranged to direct airflow generated by rotation of the storage mediums away from the transducer, thereby mitigating gas flow forces upon the transducer.

8. The apparatus of claim 1, wherein the protrusion is configured and arranged to mitigate tilt of the stacked disc separator plate arrangement associated with mounting pad tolerances by substantially preventing a torque from forming and acting on each of the disc separator plates due to forces that couple the plurality of disc separator plates to one another and the base deck.

9. The apparatus of claim 1, wherein the disc separator plates are configured and arranged to mitigate air flow-induced turbulence on the plurality of discs and to stabilize a layer of air flow at a junction between the peripheral ends of the plurality of storage mediums and a sidewall of the base deck that is concentric with, and extends at least partially along, the periphery of the storage mediums.

10. The apparatus of claim 1, wherein the disc separator plates and the base deck are configured and arranged to prevent contact between the plurality of storage mediums and the disc separator plates.

11. An apparatus for a disc drive comprising:
a plurality of storage mediums spaced apart from one another in a stacked arrangement, each storage medium having a planar surface separated by a thickness and exhibiting a periphery having a circular shape;
a base deck including a sidewall forming a cavity, the base deck configured and arranged to house the plurality of storage mediums;
a plurality of stacking rings having surfaces that are concentric with the periphery of the plurality of storage mediums and the base deck sidewall, the stacking rings extending laterally along a portion of the periphery of the storage mediums; and
a plurality of disc separator plates in a stacked arrangement extending into a space between peripheral ends of adjacent ones of the storage mediums, each disc separator plate including at least one mounting pad having a surface that faces an adjacent surface of one of the stacking rings, wherein at least one of the mounting pad surfaces includes a protrusion extending toward and contacting the adjacent surface of the one of the stacking rings.

12. The apparatus of claim 11, wherein the protrusion is configured and arranged to facilitate alignment of the plurality of disc separator plates and the plurality of stacking rings in response to a force that couples the plurality of disc separator plates and the plurality of stacking rings to one another and to the base deck.

13. The apparatus of claim 11, wherein the disc separator plates are configured and arranged with the stacking rings and the base deck to mitigate generation of gas flow via movement of the storage mediums.

14. The apparatus of claim 11, wherein each protrusion is configured and arranged to maintain a single point of contact or a line of contact between the disc separator plate from which it extends and the stacking ring with which it contacts, thereby mitigating conformance of the mounting pad surface and a surface of the stacking ring to one another.

15. The apparatus of claim 11, further including a fastener configured and arranged to couple the plurality of disc separator plates and the plurality of stacking rings to one another and the base deck by directing a force through the protrusion and the at least one mounting pad of each disc separator plate.

16. The apparatus of claim 11, wherein the at least one mounting pad is configured and arranged to mitigate tilt of the stacked disc separator plate arrangement associated with mounting pad tolerances by using the protrusion to substantially prevent a moment force from acting on each of the disc separator plates in response to a force that couples the plurality of disc separator plates and the plurality of stacking rings to one another and to the base deck.

17. The apparatus of claim 11, wherein each surface of adjacent ones of the mounting pads and stacking rings that face each other is configured and arranged with the protrusion to mitigate conformance of the disc separator plates and stacking rings, by using the protrusion to provide a contact region having a reduced size, relative to a contact region for each adjacent surface directly contacting one another.

18. The apparatus of claim 11,
further including a transducer configured and arranged to access data storage locations on one of the plurality of storage mediums, and
wherein the plurality of disc separator plates and the plurality of stacking rings are circumferentially disposed at an outer circumference of the plurality of storage mediums, and the plurality of disc separator plates are configured and arranged to direct gas flow generated by rotation of the storage medium away from the transducer, thereby mitigating gas flow forces upon the transducer.

19. The apparatus of claim 11, wherein the protrusion is configured and arranged to mitigate tilt of the disc separator plates associated with mounting pad tolerances by substantially preventing a moment force from developing between respective ones of the disc separator plates.

20. The apparatus of claim 11, wherein the disc separator plates are configured and arranged with the base deck and stacking rings to prevent contact between the plurality of storage mediums and the disc separator plates.

* * * * *